United States Patent Office 3,825,504
Patented July 23, 1974

3,825,504
HYDROCARBON HYDROPROCESSING
CATALYST
Lee Hilfman, Mount Prospect, Ill., assignor to Universal
Oil Products Company, Des Plaines, Ill.
No Drawing. Filed Jan. 27, 1972, Ser. No. 221,450
Int. Cl. B01j 11/06, 11/08, 11/32
U.S. Cl. 252—464                    7 Claims

ABSTRACT OF THE DISCLOSURE

A hydroprocessing catalyst of an alumina-containing carrier material, a nickel component and a Group V–B metallic component. The catalyst is prepared via coextrusion which inhibits the formation of nickel aluminate to the extent that less than about 0.1% thereof appears in the final catalytic composite.

APPLICABILITY OF INVENTION

Hydrocarbon hydroprocessing alludes to the conversion of hydrocarbonaceous material wherein a chemical consumption of hydrogen occurs. Principal among such hydroprocesses are hydrocracking of heavier hydrocarbons into lower-boiling hydrocarbon products and hydrotreating, or hydrorefining, wherein a hydrocarbonaceous feed stock is "cleaned-up" in order to prepare a charge stock suitable for utilization in a subsequent conversion process. Although applicable to other hydrogen-consuming processes—i.e. the hydrogenation of aromatic hydrocarbons— the present invention is particularly directed toward a catalytic composite which exhibits an unusual degree of stability when utilized in a hydrocracking process.

With respect to a hydrorefining process, the same is widely employed to produce a substantially saturated charge stock, for use, for example, in a subsequent catalytic reforming process, which charge stock is substantially free from sulfurous and nitrogenous compounds. Hydrorefining is not, however, limited to improving the physical and chemical characteristics of a naphtha boiling range charge stock, but is equally applicable to higher boiling feed stocks. The literature is replete with a multitude of processes and catalysts employed in the treatment of heavier charge stocks including kerosene, light gas oils, full boiling range gas oils, heavy gas oils and even "black oils." In petroleum refining technology, a black oil is considered to be one containing excessive quantities of sulfurous and nitrogenous compounds, high molecular organometallic complexes and a considerable quantity of asphaltic material.

The present invention is especially advantageous when utilized in a process for hydrocracking hydrocarbonaceous material to produce lower-boiling hydrocarbon products. The principal advantage stems from increased catalyst stability, or the capability to perform intended functions for an extended period of time. Thus, the present invention can be utilized for the maximum production of LPG (liquefied petroleum gas) in the propane/butane range from naphtha, or gasoline boiling range fractions. Heavier charge stocks, including kerosenes, light gas oils, heavy gas oils and "black oils" can be converted into lower-boiling products including gasolines, kerosenes, middle-distillates, etc.

The catalytic composite which constitutes the present invention is a dual-function catalyst; that is, it possesses both hydrogenation and cracking activity. It is not only important that the dual-function catalyst exhibit the capability to perform its specified functions initially, but also that it has the propensity to perform in a satisfactory manner for prolonged periods of time. The analytical terms, employed in the petroleum refining art, to measure the degree to which a particular catalyst performs, are activity, selectivity and stability. For the purposes of discussion herein, these terms are conveniently defined, for a given charge stock as follows: (1) activity is the measure of the ability of the catalyst to convert the hydrocarbon reactants into the desired product, at a specified severity level, wherein the latter connotes the operating conditions employed; (2) selectivity refers to the quantity of the reactants that are converted into the desired product and/or products; and, (3) stability refers to the rate of change of activity and selectivity parameters—the smaller rate implying the more stable catalyst. With respect to hydrocracking, for example, activity, stability and selectivity are similarly defined, and for the most part, allude to the same considerations. Thus, "activity" refers to the quantity of charge stock, boiling above a given temperature which is converted to hydrocarbons boiling below the given temperature. "Selectivity" connotes that quantity of converted charge stock which boils below the desired end point of the product, and above a minimum specified initial boiling point. "Stability" refers to the rate of change of activity and selectivity. For example, where a gas oil, boiling above a temperature of about 650° F., is subjected to hydrocracking, "activity" connotes the conversion of 650° F.-plus charge stock into 650° F.-minus product. "Selectivity" might allude to a degree of conversion into gasoline boiling range hydrocarbons—i.e. pentanes and heavier normally liquid hydrocarbons boiling up to a temperature of about 400° F. "Stability" is conveniently expressed in terms of the temperature increase during various increments of catalyst life, to maintain the desired activity and selectivity.

OBJECTS AND EMBODIMENTS

A principal objects of the present invention is to provide a novel catalytic composite for utilization in the conversion of hydrocarbonaceous material.

Another object is to provide an improved process for hydrocracking a hydrocarbon feed stock, which process is effected through the use of a coextruded catalytic composite of an alumina-containing carrier material, a nickel component and a Group V–B component.

Therefore, in one embodiment, the present invention provides a catalyst comprising coextruded particles of an alumina-containing porous carrier material, a nickel component and a Group V–B component, said catalyst containing less than about 0.1% by weight of nickel aluminate.

In another embodiment, my invention affords a process for hydrocracking a hydrocarbonaceous charge stock which comprises reacting said charge stock with hydrogen in contact with a catalytic composite of coextruded particles of an alumina-containing carrier material, a nickel component and a Group V–B component, and containing less than about 0.1% by weight of nickel aluminate.

In a specific embodiment, the hydrocracking conditions include a maximum catalyst bed temperature of about 600° F. to about 900° F., a pressure of about 500 to about 5,000 p.s.i.g., a liquid hourly space velocity of about 0.1 to about 10.0 and a hydrogen concentration in the range of about 1,000 to about 50,000 s.c.f./bbl.

Other objects and embodiments of my invention relate to additional details regarding the preferred catalytic ingredients, the concentration of components within the catalytic composite, the method of catalyst preparation, preferred processing techniques and similar particulars which are hereinafter set forth in the following, more detailed summary of my invention.

SUMMARY OF INVENTION

Catalytic composites which are tailored for the conversion of hydrocarbonaceous material, and particularly for use in a hydrocracking or hydrorefining process, have traditionally consisted of metallic elements chosen from Groups VI–B and VIII of the Periodic Table. In general, preferred metal components have been nickel and molybdenum, or nickel and tungsten, and these components are generally combined with a porous carrier material comprising both alumina and silica, either amorphous, or zeolitic in nature. Ample evidence may be found in the literature to indicate that the nickel component materially contributes to the desired activity of such catalytic composites. A perusal of the published literature relative to this phase of catalysis, confirms this effect of nickel on catalytic activity. Furthermore, the prior art indicates a preference for two particular methods of catalyst preparation. One method, predominantly preferred, involved impregnating a previously calcined, preformed carrier material, generally in the form of spheres or pills, with suitable soluble compounds of the nickel component and the Group VI–B component, where utilized. The impregnating technique is generally followed by drying at a temperature of about 300° F., and calcination at a temperature of about 1100° F. The second preparation scheme involved coprecipitating all the components, including those of carrier material. For example, an aqueous solution of aluminum chloride, sodium silicate and nickel chloride is formed and coprecipitated by the addition of ammonium hydroxide. While speculatively teaching that the final catalytic composite may take the form of extrudates, the prior art quite clearly indicates an overwhelming preference for spheres and/or pills which either are impregnated with the metallic components, or coprecipitated therewith.

Investigations in the area of nickel-containing catalysts have indicated that an acceptable coextruded catalyst is not readily prepared. The poor results obtained with such catalysts appear to be inherent in the catalyst manufacturing method. Extrudates are generally prepared by a technique which involves coprecipitating the carrier material and the nickel component, followed by filtering and low-temperature drying, the resulting precipitate being rehydrated to a proper consistency for extrusion. The extrudates are then subjected to drying and high-temperature calcination. During this calcination step, the nickel components react with alumina to form nickel aluminate, the presence of which effectively destroys the desired activity of the catalyst, particularly with respect to hydrocracking and hydrorefining.

A very active and stable hydroprocessing catalyst can be prepared in the form of extrudates by coextruding a preformed alumina-containing carrier material with the nickel component in the presence of a Group V–B component, and particularly a vanadium component. When the formed extrudates are dried and calcined, the presence of the Group V–B component inhibits the reaction of the nickel component with the alumina to the extent that less than 0.1% by weight of the nickel aluminate deactivating influence is produced.

Other advantages include the attractive economics attendant a more simple and faster catalyst preparation technique. It will immediately be recognized by those possessing expertise in the art of catalyst manufacturing schemes that coextrusion eliminates several tedious steps involved, for example, in an impregnation technique. Furthermore, equipment of large capacity is made possible, leading to a greater catalyst production in a shorter period of time. One principal advantage resides in the production of catalyst particles, coextrudates, having pore diameters in the highly desired range of about 100 to about 300 Angstroms. Control of the pore diameter, or size, is readily regulated by the pressure imposed during the initial formation of the extrudates. With respect to spheres and/or pills, control of pore diameter is available only through precise and tedious monitoring of the apparent bulk density. A distinct processing advantage arises as a result of the fact that the coextruded catalyst of the present invention regains its stability following regeneration after an extended period of operation.

An essential feature of the present invention is that the porous carrier material be preformed prior to coextrusion with the catalytically active metallic components. It is preferred that the porous carrier material be an adsorptive, high-surface area support. Suitable carrier materials are selected from the group of amorphous refractory inorganic oxides including alumina, titania, and zirconia, silica, chromia, magnesia, boria, hafnia, and mixtures of two or more, including alumina-zirconia, silica-alumina, alumina-silica-boron phosphate, etc. When of the amorphous refractory inorganic oxide type, a preferred carrier material constitutes a co-precipitated composite of alumina and silica, with silica being present in an amount of from about 10.0% to about 90.0% by weight. In many applications of the present invention, the carrier material will consist of a crystalline aluminosilicate. This may be naturally-occurring, or synthetically-prepared, and includes mordenite, faujasite, Type A or Type U molecular sieves, etc. The porous carrier material may be a mixture of the two wherein the zeolitic material is dispersed within an amorphous matrix. It is understood that the preparation of the catalyst does not involve coprecipitation of the active metallic components with the carrier material. The latter is preformed prior to any contact with the nickel component or the Group V–B component. Following the formation of the co-extruded extrudates, the composite will generally be dried at a temperature in the range of about 200° F. to about 600° F., for a period of from 2 to about 24 hours or more, and finally calcined at a temperature of about 700° F. to about 1200° F., in an atmosphere of air, for a period of about 0.5 to about 10 hours. When the carrier material comprises a crystalline aluminosilicate, it is preferred that the calcination temperature not exceed about 1000° F.

The initial step in the catalyst preparation method involves commingling the preformed carrier material, for example, a composite of 63.0% by weight of alumina and 37.0% by weight of silica, with salts of nickel and the selected Group V–B metal component. Reference to Group V–B herein is intended to allude to the *Periodic Table of the Eylements*, E. H. Sargent & Co., 1964, and includes vanadium, niobium, and tantalum, as well as mixtures thereof. The preferred Group V–B component, in view of its hydrocracking propensity, is vanadium. Such salts include nickel nitrate hexahydrate, nickel chloride, nickel bromide, vanadium dichloride, vanadium trichloride, vanadium tetrachloride, vanadyl dichloride, tantalum bromide, etc. Niobium oxybromide, niobium oxychloride and tantalum fluoride are inorganic acid-soluble and can be used in admixture with the nickel component and the preformed carrier material. Proportions are utilized which will result in a final catalytic composite comprising from about 1.0% to about 10.0% by weight of said nickel component, and from about 0.1% to about 5.0% by weight of the Group V–B component, calcuated as the elemental metals. The solid mixture is ground to a talc-like powder, about 20 to 100 mesh, and preferably from 30 to 50 mesh, and intimately admixed with a relatively minor quantity of a suitable acid such as hydrochloric acid, nitric acid, etc. A preferred technique involves mulling the acidic mixture which is subsequently aged for a period of about fifteen minutes to about twenty hours. The Group VI–B metal component, where desired, in a concentration of about 4.0% to about 30.0% by weight, is added at this stage in the preparation technique through the use of a suitable compound such as ammonium molybdate, tungstic acid, molybdic acid, ammonium tungstate, etc. The mixture is once again subjected to mulling and a quiescent age for a period of about fifteen minutes to about two hours. The resulting plastic-type mass is extruded under a suitable pressure in the range of about 1,000 to about 10,000 p.s.i.g., to form extrudates of the desired size— e.g. 1/16-inch by 1/16-inch. After drying and calcining in the manner hereinbefore set forth, analysis indicates that the extrudates contain less than 0.1% by weight of nickel aluminate.

Although not essential to successful hydro-processing, it is often advisable to incorporate a halogen component into the catalytic composite, particularly where the same is to be utilized in a hydrocracking process. Although the precise form of the chemistry of association of the halogen component with the carrier material and the metallic components is not accurately known, it is customary in the art to refer to the halogen component as being combined with one of the other ingredients of the catalyst. The halogen may be either fluorine, chlorine, iodine, bromine, or mixtures thereof, with fluorine and chlorine being particularly preferred. The quantity of halogen is such that the final catalytic composite contains about 0.1% to about 3.5% by weight, and preferably from about 0.5% to about 1.5% by weight, calculated on the basis of the elemental halogen.

Prior to its use in the conversion of hydrocarbons, the catalytic composite is generally subjected to a substantially water-free reduction technique. Substantially pure and dry hydrogen (less than about 30.0 vol. p.p.m. of water) is employed as the reducing agent. The calcined catalytic composite is contacted at a temperature of about 800° F. to about 1200° F., for a period of about 0.5 to about 10 hours, and effective to substantially reduce metallic components.

Additional improvements are generally obtained when the reduced composite is subjected to presulfiding for the purpose of incorporating therein from about 0.05% to about 0.5% by weight of sulfur, on an elemental basis. This presulfiding treatment is effected in the presence of hydrogen and a suitable sulfur-containing compound such as hydrogen sulfide, lower molecular weight mercaptans, various organic sulfides, carbon disulfide, etc. The preferred technique involves treating the reduced catalyst with a sulfiding gas, such as a mixture of hydrogen and hydrogen sulfide having about 10 mols of hydrogen per mol of hydrogen sulfide, at conditions selected to effect the desired incorporation of sulfur. It is generally considered a good practice to perform the presulfiding technique under substantially water-free conditions.

In accordance with my invention, the hydrocarbon charge stock and hydrogen are contacted with a catalyst of the type described above in a hydrocarbon conversion zone. The contacting may be accomplished by using the catalyst in a fixed-bed system, a moving-bed system, and a fluidized-bed system, or in a batch-type operation. In view of the risk of attrition loss of the catalyst, and further in view of the technical advantages attendant thereto, it is preferred to utilize a fixed-bed system. In this type of system, a hydrogen-rich vaporous phase and the charge stock are preheated by any suitable heating means to the desired initial reaction temperature, the mixture being passed into the conversion zone containing the fixed-bed of the catalytic composite. It is understood, of course, that the hydrocarbon conversion zone may consist of one or more separate reactors having suitable means therebetween to insure that the desired conversion temperature is maintained at the inlet to one or more catalyst beds. The reactants may be contacted with the catalyst in either upward, downward, or radial flow fashion, with a downward/radial flow being preferred.

Hydroprocessing reactions are generally exothermic in nature, and an increasing temperature gradient will be experienced as the hydrogen and charge stock traverse the catalyst bed. It is desirable to maintain the maximum catalyst bed temperature below about 900° F., which temperature is virtually identical to that which may be conveniently measured at the outlet of the reaction zone. In order to insure that the catalyst bed temperature does not exceed the maximum allowed, conventional quench streams, either normally liquid or normally gaseous, and introduced at one or more intermediate loci of the catalyst beds, may be utilized. When hydrocracking hydrocarbonaceous charge stocks, a portion of the normally liquid product effluent boiling above the end boiling point of the desired product will generally be recycled to combine with the charge stock. In this type of process, the combined liquid feed ratio (defined as volumes of total liquid charge to the reaction zone per volume of fresh liquid charge to the reaction zone) will be within the range of about 1.1 to about 6.0.

ILLUSTRATIVE EMBODIMENTS

Specific operating conditions, processing techniques, particular catalytic composites and other individual processing details will be given in the following description of processes to which my invention is applicable. It is not intended that the present invention be limited to the specifics, nor is it intended that any given process be limited to the particular operating conditions, the catalytic composite, processing techniques, charge stock, etc.

EXAMPLE I

This particular embodiment will be described in conjunction with a hydrocracking process intended to produce maximum quantities of LPG from a hexane-plus naphtha fraction having the properties indicated in the following Table I:

TABLE I

Naphtha Charge Stock Properties

| | |
|---|---|
| Gravity, ° API | 56.5 |
| ASTM distillation, ° F.: | |
| IBP | 140 |
| 50.0% | 304 |
| End point | 398 |
| Sulfur, wt. percent | 0.08 |
| Nitrogen, wt. p.p.m. | 2.0 |

In general, hydrocracking conditions include a maximum catalyst bed temperature of about 600° F. to about 900° F., a pressure of about 500 to about 5,000 p.s.i.g., a liquid hourly space velocity of about 0.1 to about 10.0 and a hydrogen concentration in the range of about 1,000 to about 50,000 s.c.f./bbl. Obviously, the precise operating conditions in a given circumstance will depend primarily on the physical and/or chemical characteristics of the charge stock, as well as the desired end result.

The hydrocracking catalyst is prepared by comingling finely-divided nickel nitrate hexahydrate and vanadium trichloride with a preformed carrier material. The latter is a 50/50 mixture of (1) an amorphous composite of 63.0% by weight of alumina and 37.0% by weight of silica, and (2) a crystalline aluminosilicate, more than 90.0% by weight of which constitutes faujasite. The solid mixture is ground to a powder having a size of about 40 mesh, and intimately admixed with concentrated nitric acid ond water by mulling. A subsequent aging step is effected for a period of about ½ hour. The resulting plastic-type mass is extruded at a pressure of about 4,000 p.s.i.g., to form 1/16-inch by 1/16-inch (approximate measurements) extrudates. These are dried at a temperature of about 225° F. for three hours and calcined, in an atmosphere of air, at a temperature of about 1000° F. for a period of about one hour. Analyses indicate that the extrudates have an apparent bulk density of about 0.72 and contain about 5.2% by weight of nickel and 2.0% by weight of vanadium, calculated as the elemental metals; the concentration of nickel aluminate is found to be less than about 0.1% by weight.

The charge stock, in an amount of about 5,000 bbl./day, is admixed with about 10,700 s.c.f./bb. of hydrogen, and contacts the catalytic composite at a temperature of about 750° F. Through the utilization of a hydrogen quench in an amount of about 4,700 s.c.f./bbl., the increasing temperature gradient is controlled at a level of about 100° F. such that the maximum catalyst bed temperature is 850° F. The liquid hourly space velocity, based on fresh feed only, is 1.2.

Component yields and product distribution are presented in the following Table II.

TABLE II.—LPG YIELDS AND PRODUCT DISTRIBUTION

| Component | Wt. percent | Vol. percent |
|---|---|---|
| Ammonia | | |
| Hydrogen sulfide | | |
| Methane | 0.40 | |
| Ethane | 1.49 | |
| Propane | 22.68 | 33.62 |
| Butane | 42.24 | 59.69 |
| Pentanes | 33.43 | 40.20 |
| Total | 103.33 | 133.51 |

Following separation of the product effluent to provide a propane/butane concentrate and a pentane stream, the unconverted hexane-plus fraction is recycled in an amount of 2,500 s.c.f./bbl. to provide a combined liquid feed ratio of 1.5. It is noted that the LPG production is 93.31% by volume, based upon fresh feed, or about 4,665 bbl./day. An adidtional advantage resides in the fact that the pentane concentrate constitutes about 80.0 vol. percent isopentane, has a clear research octane rating of 86.0 and a leaded research octane rating of 100. Therefore, the pentane concentrate enjoys an immediate use as a blending component in the refinery gasoline pool.

EXAMPLE II

In this illustration, the charge stock is a full boiling range gas oil having the properties indicated in the following Table III:

TABLE III

Gas Oil Properties

Gravity, ° API _____ 22.2
ASTM distillation, ° F.:
    IBP _____ 680
    10.0% _____ 750
    30.0% _____ 790
    50.0% _____ 820
    70.0% _____ 865
    90.0% _____ 915
    End point _____ 1000
Sulfur, wt. percent _____ 1.61
Nitrogen, wt. p.p.m. _____ 1000

The gas oil charge stock is processed in two stages, the first of which effects the hydrorefining of the feed stock with some conversion to lower-boiling products, while the second stage is designed to maximize the production of a naphtha fraction containing heptanes and hydrocarbons boiling up to a temperature of about 350° F. The hydrorefining catalyst is prepared by commingling finely-divided nickel nitrate hexahydrate and vanadium dichloride with a preformed carrier material of 63.0% by weight of alumina and 37.0% by weight of silica. After mulling and aging, as above described, ammonium molybdate is added to the plastic mass, the same is again mulled and aged for a ½-hour period. The extrudates are then formed, dried and calcined in the manner hereinbefore set forth. Analyses indicate that the extrudates have an apparent bulk density of about 0.77 and contain 3.4% by weight of nickel, 1.7% by weight of vanadium and about 6.8% by weight of molybdenum, calculated as the elemental metals. The hydrocracking catalyst is prepared in much the same manner utilizing a carrier material of 75.0% by weight of silica and 25.0% by weight of alumina. The concentration of the nickel and vanadium components are increased, while the molybdenum component is eliminated. Sufficient nickel nitrate hexahydrate and vanadium dichloride are utilized as above to result in a final catalytic composite comprising about 5.0% by weight of nickel and 3.0% by weight of vanadium; the finished catalyst has an apparent bulk density of about 0.80.

In a two-stage system, functioning in series-flow, the focal point for pressure control is the cold separator into which the second zone effluent is introduced. In the present situation, the pressure on the hydrorefining reaction zone is maintained at a level such that the cold separator pressure is about 2,000 p.s.i.g. The charge stock, in an amount of about 25,000 bbl./day, is admixed with about 10,000 s.c.f./bbl. of hydrogen and contacts the hydrorefining catalyst at a liquid hourly space velocity of about 0.86. The maximum catalyst bed temperature is about 850° F.

Yields and product distribtuion with respect to the effluent from the hydrorefining reaction zone are presented in the following Table IV:

TABLE IV.—HYDROREFINING YIELDS AND PRODUCT DISTRIBUTION

| Component | Wt. percent | Vol. percent |
|---|---|---|
| Ammonia | 0.12 | |
| Hydrogen sulfide | 1.71 | |
| Methane | 0.15 | |
| Ethane | 0.25 | |
| Propane | 0.50 | |
| Butanes | 1.10 | 1.75 |
| Pentanes | 0.90 | 1.32 |
| Hexanes | 1.10 | 1.46 |
| Heptane—350° F | 5.99 | 7.28 |
| 350° F.—plus | 89.96 | 93.27 |

The foregoing yields and product distribution reflect a hydrogen consumption of about 1,083 s.c.f./bbl. (1.78% by weight).

The total product effluent from the hydrorefining reaction zone is admixed with about 20,000 bbl./day of a recycle stream comprising hydrocarbonaceous material boiling above a temperature of about 350° F. The liquid hourly space velocity, based upon fresh feed only, is about 0.47 and the combined liquid feed ratio is 1.80. The maximum catalyst bed temperature is maintained at a level of about 800° F., representing an increasing temperature gradient of about 80° F., controlled by way of a hydrogen quench in an amount of about 4,300 s.c.f./bbl. An additional 1,088 s.c.f./bbl. (1.78% by weight) of hydrogen are consumed in the hydrocrcking reaction zone. Following separation of the product effluent, the unconverted material boiling above a temperature of about 350° F. is recycled to combine with the material being charged to the hydrocracking reaction zone. Overall yields and product distribution are presented in the following Table V:

TABLE V.—OVERALL YIELDS AND PRODUCT DISTRIBUTION

| Component | Wt. percent | Vol. percent |
|---|---|---|
| Ammonia | 0.12 | |
| Hydrogen sulfide | 1.71 | |
| Methane | 0.39 | |
| Ethane | 0.56 | |
| Propane | 3.81 | |
| Butanes | 15.56 | 25.16 |
| Pentanes | 11.09 | 16.33 |
| Hexanes | 16.02 | 21.33 |
| Heptane—350° F | 54.29 | 65.92 |
| Total | 103.55 | 128.74 |

With respect to the desired heptane-350° F. naphtha boiling range fraction, the same has a gravity of about 55.1° API and contains 44.9% by volume of paraffins, 41.1% naphthenes and 14.0% aromatics. It will be recognized that this product stream constitutes an excellent charge for a subsequent catalytic reforming unit. The combined pentane/hexane stream, having a gravity of about 82.4° API, has a clear research octane rating of about 83.8 and a leaded research octane rating of about 98.0, and can, therefore, be immediately utilized as a blending component for the refinery gasoline pool.

The foregoing illustrates the method of effecting the present invention as well as the benefits to be afforded through the utilization thereof.

I claim as my invention:

1. A catalyst comprising coextruded particles of an alumina-containing porous carrier material, a nickel component and a Group V–B component, said catalyst containing less than about 0.1% by weight of nickel aluminate.

2. The catalyst of Claim 1 further characterized in that a Group VI–B metal component is combined therewith.

3. The catalyst of Claim 1 further characterized in that said carrier material is an amorphous refractory inorganic oxide.

4. A catalyst comprising coextruded particles of an alumina-containing, porous carrier material, from about 1.0% to about 10.0% by weight of a nickel component and from about 0.1% to about 5.0% by weight of a Group V–B metal component, said catalyst containing less than about 0.1% by weight of nickel aluminate.

5. The catalyst of Claim 4 further characterized in that said Group V–B metal component is a vanadium component.

6. The catalyst of Claim 4 further characterized in that said Group V–B metal component in a niobium component.

7. The catalyst of Claim 4 further characterized in that said Group V–B metal component is a tantalum component.

References Cited

UNITED STATES PATENTS

| | | | |
|---|---|---|---|
| 3,580,970 | 5/1971 | Swift | 252—466 J |
| 3,617,503 | 11/1971 | Rodgers et al. | 208—112 X |
| 3,673,079 | 6/1972 | Mulaskey et al. | 208—112 X |
| 3,617,527 | 11/1971 | Hilfman | 208—216 |

CARL F. DEES, Primary Examiner

U.S. Cl. X.R.

252—465, 466 J